United States Patent [19]

Klusman

[11] Patent Number: 4,527,912
[45] Date of Patent: Jul. 9, 1985

[54] SQUEEZE FILM DAMPER

[75] Inventor: Steven A. Klusman, Indianapolis, Ind.

[73] Assignee: General Motors Corporation, Detroit, Mich.

[21] Appl. No.: 615,831

[22] Filed: May 31, 1984

[51] Int. Cl.³ .................................... F16C 27/04
[52] U.S. Cl. ..................................... 384/99
[58] Field of Search .............. 384/99, 473, 475, 535, 384/581

[56] References Cited

U.S. PATENT DOCUMENTS

| | | |
|---|---|---|
| 1,062,649 | 5/1913 | Hess . |
| 3,357,757 | 12/1967 | Morley et al. . |
| 3,424,508 | 1/1969 | Kizer et al. . |
| 3,589,782 | 6/1971 | LeBreton et al. . |
| 4,046,430 | 9/1977 | Buono et al. . |
| 4,214,796 | 7/1980 | Monzel et al. . |
| 4,337,982 | 7/1982 | Moringiello et al. . |
| 4,366,994 | 1/1983 | Yoshioka ........................... 384/99 |
| 4,457,667 | 7/1984 | Seibert et al. ...................... 384/99 |

Primary Examiner—Lenard A. Footland
Attorney, Agent, or Firm—Saul Schwartz

[57] ABSTRACT

A squeeze film damper for dynamically unbalanced rotor includes a bearing on the rotor having a non-rotatable outer race which is vibrateable as a unit with the rotor, on outer plain cylindrical surface on the bearing outer race, an inner plain cylindrical surface on a support around the outer surface concentric therewith when the rotor is aligned on a nominal axis of the support and cooperable therewith in defining a small annulus having a radial depth corresponding to the maximum radial vibratory displacement of the rotor, a groove in the inner cylindrical surface of axial length of between about ⅓ and ⅔ of the axial length of the small annulus and cooperable with the outer plain surface in defining a large annulus having a radial depth of at least three times the small annulus radial depth, the groove being axially symmetrical with respect to the small annulus, and means for maintaining the small and large annuli filled with fluid under pressure.

6 Claims, 8 Drawing Figures

SQUEEZE FILM DAMPER

BACKGROUND OF THE INVENTION

1. Field of the Invention

This invention relates, generally, to squeeze film dampers for controlling rotor vibrations and, more particularly, to an improved squeeze film damper the damping coefficient of which remains substantially constant over the full range of rotor vibratory displacement.

2. Description of the Prior Art

In high speed rotor applications, such as gasifier rotors in gas turbine engines, dynamic unbalance generates vibrations during rotor rotation which are commonly controlled or damped by squeeze film type dampers. In typical, plain squeeze film dampers where oil filled annuli are formed between stationary plain cylindrical surfaces and plain cylindrical surfaces vibrating with the rotors, coefficients of damping are relatively constant for vibratory radial displacements up to about 50% of the available clearance or depth of the squeeze film annuli. Beyond 50% displacement, the coefficients of damping in plain dampers become non-linear and the dampers become objectionably stiff. Thus, as a practical matter, 50% of the available clearance in plain squeeze film dampers is unproductive in the sense of providing damping and counterproductive in the sense that corresponding clearances are required within the engine between the rotor and surrounding stationary components such as seals. To minimize internal engine clearances, some plain dampers incorporate springs which center the rotor when the latter is stopped or rotating below damper lift-off speed and some plain dampers are teamed with external snubbers which physically limit the amount of radial displacement of the rotor. These proposals, however, are complex, expensive, and consume valuable space in the engine. A squeeze film damper according to this invention represents an improvement over these and other known plain squeeze film dampers and exhibits a substantially linear or constant damping coefficient characteristic for vibratory radial displacement of the rotor up to substantially the entire available clearance.

SUMMARY OF THE INVENTION

Accordingly, the primary feature of this invention is that it provides a new and improved squeeze film damper for controlling vibration of a dynamically unbalanced rotor. Another feature of this invention resides in the provision in the new and improved damper of a small annulus having a radial depth corresponding to maximum radial vibratory displacement of the rotor and a large annulus having a radial depth corresponding to optimum damping at maximum radial displacement, the small annulus limiting static rotor displacement to minimize engine clearance and the large annulus providing effectively linear damping coefficient at radial displacements up to the depth of the small annulus. Still another feature of this invention resides in the provision in the new and improved damper of a small annulus formed between a pair of plain cylindrical surfaces, an outer of which is fixed and an inner of which vibrates with the rotor, and in the provision of a groove in the outer surface extending over between $\frac{1}{2}$ and $\frac{2}{3}$ of the length of the small annulus and defining with the inner plain surface a large annulus centered lengthwise of the small annulus having a radial depth at least three times the radial depth of the small annulus. And a still further feature of this invention resides in the provision in the new and improved damper of a small annulus defined between an external plain cylindrical surface on an outer bearing race vibrateable with the rotor and an internal plain cylindrical surface on a support concentric with the outer cylindrical surface, the internal plain cylindrical surface having a rectangular shaped groove therein defining the radially outer portion of the large annulus of the damper.

These and other features of this invention will be readily apparent from the following specification and from the drawings wherein.

Figure 5A:
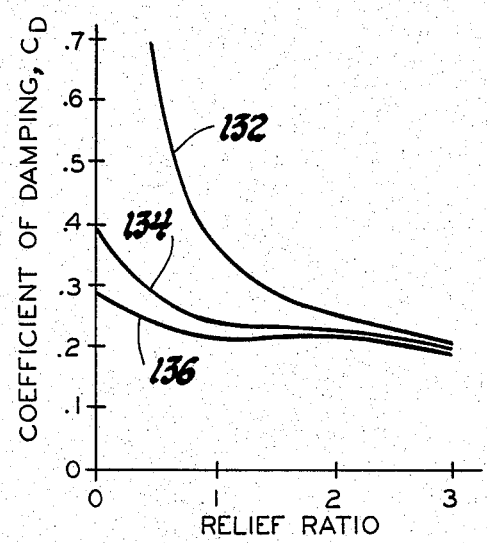
Figure 5B:
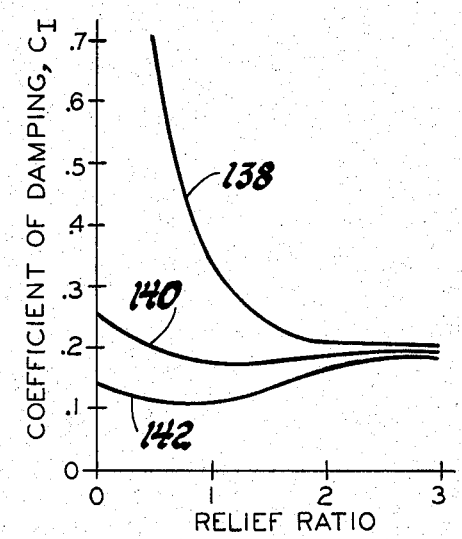
Figure 6A:
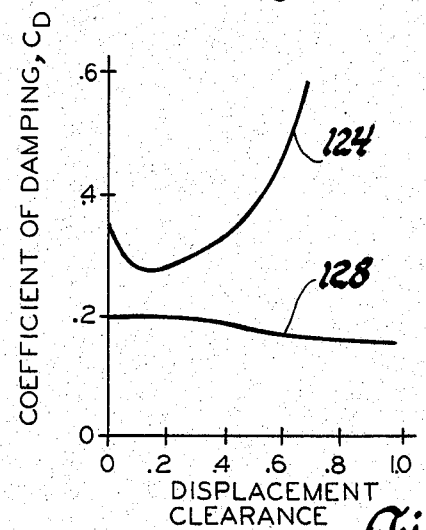
Figure 6B:
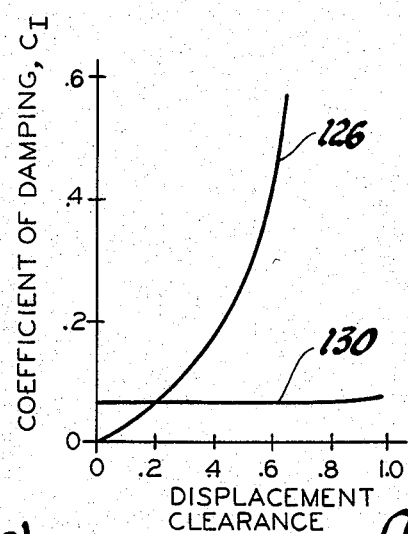

FIGS. 5(a) and 5(b) are graphic representations of the relationships between damper relief ratio and direct and indirect damping coefficients at various rotor displacements for the squeeze film damper according to this invention; and FIGS. 6(a) and 6(b) are graphic representations of the relationships between rotor displacement and direct and indirect damping coefficients for the squeeze film damper according to this invention.

Figure 1:
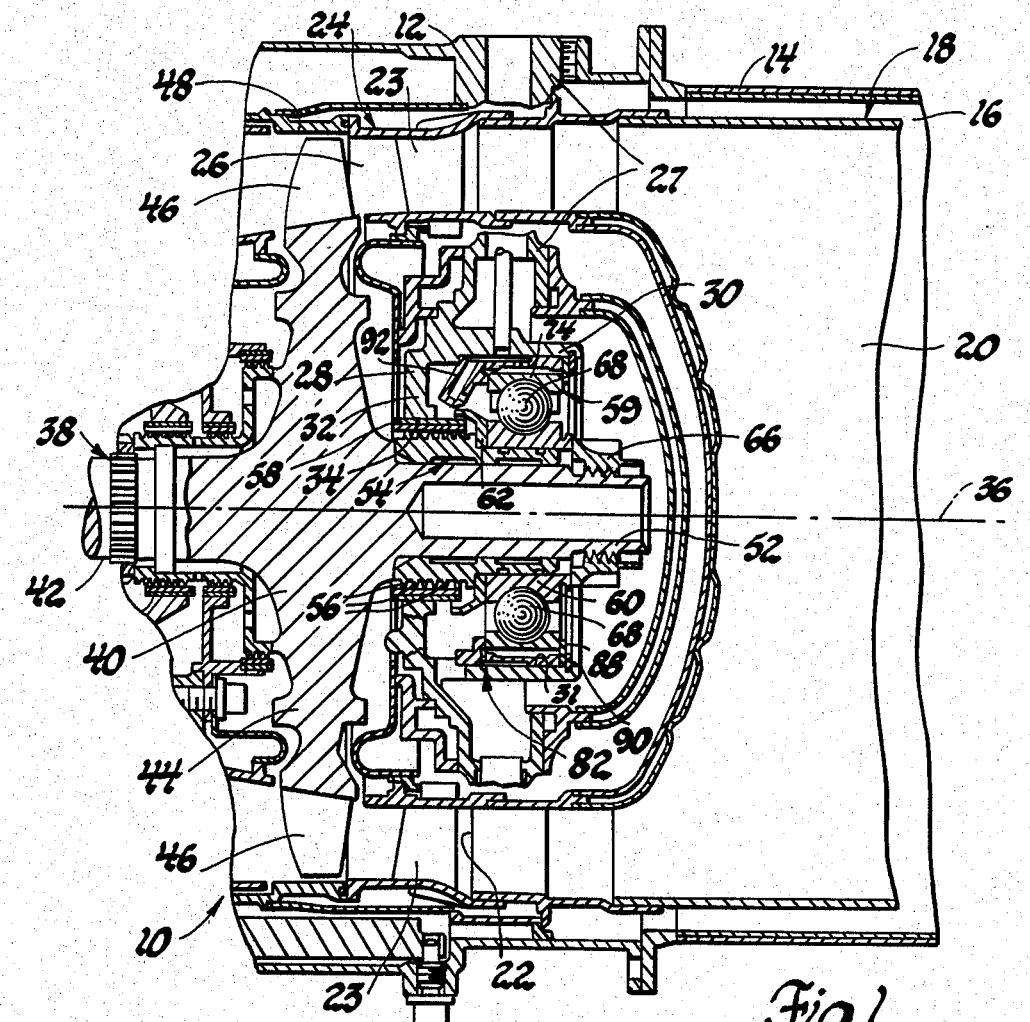
FIG. 1 is partially broken away elevational view of a portion of a gas turbine engine incorporating a squeeze film damper according to this invention.

Referring now to FIG. 1 of the drawings, a portion of the hot section of an axial flow gas turbine engine 10 is illustrated in fragmentary elevational view. The engine 10 includes a housing or engine block 12 to which is attached a generally cylindrical plenum cover 14 defining therein an air plenum 16 supplied with pressurized air from the compressor, not shown, of the engine. A generally cylindrical combustor 18, defining a combustion chamber 20 with an annular outlet 22, is disposed within the plenum 16. Pressurized air in the plenum 16 enters the combustion chamber 20 through the walls of the combustor and supports combustion therein of fuel dispersed from the opposite end of the combustor, the products of combustion being directed out of the combustion chamber through the annular outlet 22. The products of combustion exhausted through outlet 22 are directed through a plurality of vanes 23 in a nozzle ring 24 supported on the engine block 12 at the upstream end of an annular flow path 26 along which the products of combustion move. A plurality of partially illustrated spokes 27 forming a rigid part of the engine block 12 project radially inboard of the outlet 22 and the annular flow path 26 and rigidly support therewithin a web portion 28 of the engine block. The web portion has a generally cylindrical flange 30 with a bore 31 therein and a radial flange 32 with a circular aperture 34 therein, the aperture 34 and the bore 31 in the flange 30 being centered or aligned on a nominal rotation axis 36 of the engine.

A gasifier rotor 38 of the engine has a turbine end 40 and a compressor end, not shown, interconnected by a shaft 42 nominally aligned on the axis 36. The turbine end 40 includes a wheel 44 integral with the shaft 42 having a plurality of blades 46 disposed circumferentially therearound in the motive fluid flow path 26 downstream of the nozzle ring 24. A shroud ring 48 mounted on the engine block is closely fitted around the tips of the blades 46. Motive fluid is directed by the nozzle vanes 23 against the turbine blades 46 to rotate the wheel 44 and the rotor 38 and then proceeds down the flow path 26 for further redirection and expansion through subsequent turbine blade stages, not shown, of the power turbines of the engine.

Figure 2:
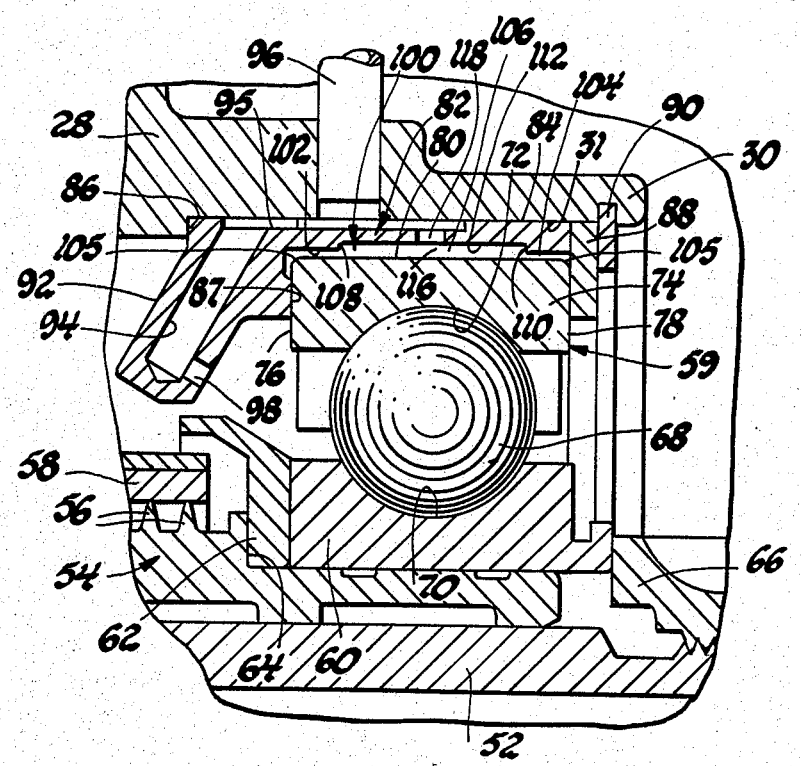
FIG. 2 is an enlarged view of a portion of FIG. 1 showing the squeeze film damper according to this invention.

As seen best in FIGS. 1 and 2, the turbine wheel 44 has an integral stub shaft 52 nominally aligned on axis 36 and projecting toward the combustor 18. A sleeve 54 is received around the stub shaft 52 and abuts the turbine wheel 44. A plurality of circular knife edges 56 on the sleeve 54 radially inboard of the circular aperture 34 in the web portion 28 cooperate with a seal 58 on the radial flange 32 in defining the conventional labyrinth seal in the aperture 34. A bearing 59 has a cylindrical inner race 60 received around the sleeve 54 with a shield ring 62 captured between the inner race and a shoulder 64 on the sleeve. The inner race and the shield ring are tightly captured between the shoulder 64 and a retainer 66 on the outboard end of stub shaft 52, the retainer 66 also functioning to tightly press the sleeve 54 against the turbine wheel 44 so that the inner race 60, the shield 62 and the sleeve 54 are all rotatable as a unit with the gasifier rotor 38.

The bearing 59 further includes a plurality of ball type anti-friction elements 68 which roll in a groove 70 in the inner race 60 and a corresponding groove 72 in a cylindrical outer race 74 of the bearing. The bearing 59 is of sufficient precision that the inner race 60 is freely rotatable relative to the outer race 74 with substantially no clearance or play perpendicular to the axis 36 so that the outer race 74 vibrates as a unit with the rotor 38. The outer race 74 has a first lateral face 76, a second lateral face 78, and an outer or external plain cylindrical surface 80 therebetween.

As seen best in FIG. 2, a generally cylindrical damper sleeve 82 has an outside diameter 84 corresponding to the diameter of bore 31 in the cylindrical flange 30 on web portion 28 of the engine block. The damper sleeve is received in the bore 31 and abuts a shoulder 86 on the flange with a key, not shown, preventing rotation of the sleeve in the bore. The outer race 74 of the bearing is, in turn, received within the damper sleeve with the first lateral face 76 abutting a shoulder 87 of the damper sleeve. A flat ring 88 oriented in a transverse plane perpendicular to axis 36 is closely received within the bore 31 of the cylindrical flange 30 and abuts the outboard end of the damper sleeve and the second lateral face 78 of the outer race 74. The flat ring 88 is held in position capturing the damper sleeve 82 and the outer race 74 of the bearing 59 by a retainer 90 seated in an appropriate groove in the cylindrical flange 30. An integral lubrication spigot 92 on the damper sleeve 82 has an internal bore 94 in communication with an external groove 95 in the damper sleeve which, in turn, is open to a lubricant supply conduit 96 of the engine whereby lubricating fluid is pumped from the conduit 96 through a nozzle 98 in the spigot onto the rolling elements 68 of the bearing 59. The outer race 74 of the bearing is keyed or otherwise connected to the damper sleeve 82 in a manner which prevents relative rotation between the damper sleeve and the outer race but which allows the outer race to vibratorily orbit or translate within the damper sleeve.

Figure 3:
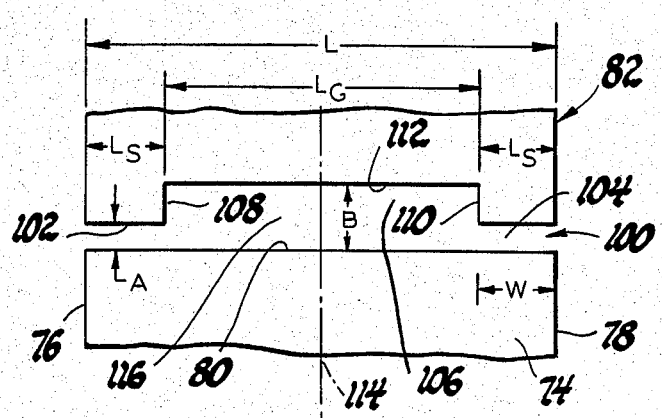
FIG. 3 is an enlarged schematic longitudinal cross section of the squeeze film damper according to this invention.
Figure 4:
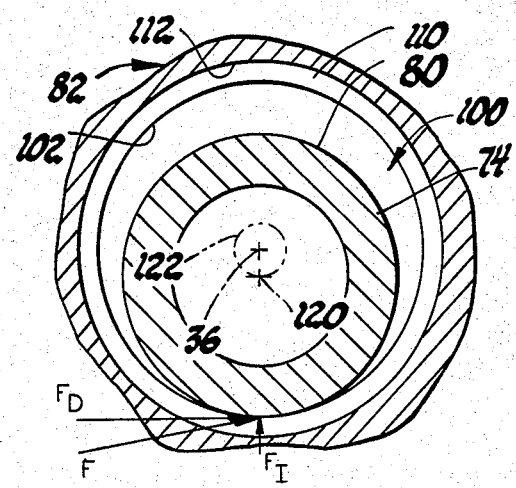
FIG. 4 is a schematic transverse cross section of the squeeze film damper according to this invention.

Referring particularly to FIGS. 2, 3 and 4, a squeeze film damper 100 according to this invention is defined between the bearing outer race 74 and the damper sleeve 82 to damp vibrations of the rotor 38 at the turbine end 40. The damper includes the plain outer cylindrical surface 80 of the bearing outer race and a plain inner or internal cylindrical surface 102 formed on the damper sleeve 82 in surrounding relation to the outer surface 80. When the stub shaft 52 of the rotor is precisely aligned on nominal rotational axis 36 of the engine, the inner and outer surface 102 and 80, respectively, are concentric and cooperate in defining an inner or small annulus 104. The radial depth of the small annulus 104, designated A in FIG. 3 and exaggerated for clarity, is the clearance between the bearing outer race 74 and the damper sleeve 82 and represents the maximum permissible vibratory radial displacement of the stub shaft 52 at the turbine end from the axis 36. The axial length of the small annulus 104, designated L in FIG. 3, is the axial length of the damper 100 and corresponds to the distance over which the plain inner and outer surfaces 102 and 80, respectively, remain concentric and does not include, for example, the outer most extremities where the outer surface 80 on the bearing outer race 74 merges with a pair of radiused corners 105, FIG. 2, between the lateral faces 76 and 78 and outer surface 80.

The squeeze film damper 100 further includes a step in the inner plain surface 102 in the form of a groove 106 in the damper sleeve 82 opening through the plain inner surface. The groove 106 is rectangular in longitudinal cross section, FIGS. 2 and 3, and includes a pair of opposite sides 108 and 110 and a plain cylindrical base 112. The sides 108 and 110 are symmetrical with respect to a transverse plane 114 perpendicular to axis 36 midway between the ends of the small annulus 104 so that the groove 106 divides the small annulus into a pair of identical halves of lengths $L_S$, FIG. 3, separated by the groove 106. The base 112 is concentric with the inner plain surface 102 and is located at a radial distance from the axis 36 which exceeds the radial distance from the axis to the inner plain surface 102 so that when the stub shaft 52 is precisely aligned on axis 36 the base 112 cooperates with the outer plain surfaces 80 on the bearing race in defining an outer or large annulus 116 having a radial depth B, FIG. 3. The large annulus 116 communicates with the external groove 95 in the damper sleeve 82 through a passage 118 so that during engine operation the large and small annuli are filled with hydraulic fluid. While illustrated as being formed in the inner surface 102, the groove 106 could, alternatively, be formed in the outer surface 80 without altering the characteristics of the squeeze film damper 100.

In operation, the squeeze film damper 100 according to this invention is an improvement over plain squeeze film dampers of comparable capacity. More particularly, when the rotor 38 is at rest or rotating below damper lift-off speed, gravity draws the stub shaft 52 down until the bearing outer plain surface 80 rests on the separated halves of the inner surface 102 at points directly below axis 36. The small and large annuli 104 and 116, respectively, are thus locally constricted below the axis 36, FIG. 4. The center of the stub shaft 52, designated 120 in FIG. 4, is likewise displaced radially downward a distance corresponding to the radial depth A of the small annulus 104 as are the rotor extremities such as the knife edges 56 and the tips of the turbine blades 46. Around the rotor within the engine, then, a clearance equal to the radial depth A must be maintained. However, because the radial depth A is generally equal to the maximum radial vibratory displacement of the rotor, the required clearance is the minimum possible clearance for the rotor and, therefore, represents no sacrifice of engine efficiency as does the excess clearance which is a necessary part of heretofore known plain squeeze film dampers.

As the speed of the rotor 38 increases, the outer plain surface 80 on the bearing outer race 74 lifts off of the separated halves of the inner plain surface 102. Lift-off occurs when the magnitude of the rotor dynamic unbalance force vector, not shown, exceeds the weight of the rotor whereupon the center 120 of the stub shaft commences to orbit in a circle 122, FIG. 4, around the axis 36 while the outer race 74 concurrently orbits in a circle around the axis 36 without rotation relative to the damper sleeve 82. The radius of the circle 122 is the radial vibratory displacement of the stub shaft 52 and has a maximum value corresponding to the radial depth A of the small annulus 104. Assuming maximum radial displacement, the accompanying localized constriction of the small and large annuli orbits around the axis 36 at the speed of the rotor, pushing fluid ahead of it, and developing a force vector F, FIG. 4, resisting or damping vibratory displacement of the stub shaft and the bearing outer race. The damping force vector F is developed primarily in the large annulus 116 which, because its radial depth B substantially exceeds the radial displacement A, exhibits characteristics similar to characteristics exhibited by an ordinary plain squeeze film damper for vibratory displacements in the range of about 50% of available clearance.

With respect, now, to the performance of the squeeze film damper 100 according to this invention, the resultant force vector F includes a direct component $F_D$ generally tangent to the inner and outer plain surfaces 102 and 80, respectively, at the local constriction of the small and large annuli 104 and 116, respectively, and an indirect component $F_I$ perpendicular to the direct component. The direct component resists orbital translation of the bearing outer race 74 and provides direct damping while the indirect component $F_I$ resists radial displacement of the bearing outer race and provides indirect damping. The magnitudes of the direct and indirect components are related to the speed and vibratory displacement of the rotor by proportionality factors known as coefficients of direct and indirect damping, $C_D$ and $C_I$, respectively. Ideally, $C_D$ and $C_I$ are constant regardless of actual vibratory radial displacement. In FIGS. 6(a) and 6(b), however, a pair of curves 124 and 126 illustrate the actual relationships for a typical plain squeeze film damper between $C_D$ and $C_I$, respectively, and vibratory radial displacement expressed as a ratio of actual displacement to total clearance or total available displacement. Curve 124 shows that $C_D$ is somewhat linear or constant over only a small range where actual displacement is about 30 to 50 percent of available clearance and $C_I$ is effectively non-linear over the full range of displacement. By comparison, a corresponding pair of curves 128 and 130, FIGS. 6(a) and 6(b), respectively, illustrate the same relationship for the damper 100 according to this invention. Both $C_D$ and $C_I$ for the damper 100 are substantially constant over the full range of rotor displacement.

In the damper 100 according to this invention, $C_D$ and $C_I$ are also related to dimensional parameters known as relief ratios, R, where $R=(B/A)-1$ and B and A are the radial depths of the large and small annuli 116 and 104, respectively. A curve 132, FIG. 5(a), illustrates the relationship between $C_D$ and R where the vibratory radial displacement of the rotor is 80% of maximum and a pair of curves 134 and 136 illustrate the same relationship where displacement is 50% and 20% of maximum, respectively. Where R is less than 2, $C_D$ is non-linear and where R exceeds 2, $C_D$ is substantially constant or linear. Similarly, in FIG. 5(b), a plurality of curves 138, 140 and 142 relate $C_I$ and R for radial displacement of 80%, 50% and 20% of maximum, respectively, and show that $C_I$ is linear where R exceeds 2 and is non-linear where R is less than 2. Accordingly, since linear coefficients of damping are desirable, the radial depth B of large annulus 116 must be on the order of at least three times the radial depth of the small annulus. In addition, the length of the groove 106, designated $L_G$ in FIG. 3, is related to the length L of the damper 100 in the sense that as $L_G$ decreases, the characteristics of the damper 100 approach those of a plain damper having a radial depth equal to the radial depth A of the small annulus 104 and as $L_G$ increases and $L_S$ on opposite sides of the groove decreases, the fluid seal effect of the separated halves of the small annulus 104 decreases thereby permitting the fluid pressure in the large annuli 116 to decrease and degrading the direct and indirect damping performance of the damper. Accordingly, the length $L_G$ of groove 106 is ideally limited to a range of between $\frac{1}{2}$ and $\frac{2}{3}$ of the length L of the damper.

The embodiments of the invention in which an exclusive property or privilege is claimed are defined as follows:

1. A squeeze film damper for damping vibration of a rotor disposed on a support for rotation about a nominal axis of said support comprising, means on said rotor defining a non-rotatable outer plain cylindrical surface vibrateable as a unit with said rotor, means on said support defining an inner plain cylindrical surface concentric with said outer surface when said rotor is aligned on said nominal axis and cooperating with said outer surface in defining a small annulus having a predetermined axial length and a radial depth corresponding to the maximum radial vibratory displacement of said rotor, means defining a groove in one of said inner and said outer surfaces including a plain cylindrical base surface having an axial length of between $\frac{1}{2}$ and $\frac{2}{3}$ of said small annulus axial length and cooperating with the other of said inner and said outer surfaces when said rotor is aligned on said nominal axis in defining a large annulus having a radial depth of at least three times said small annulus radial depth, and means for maintaining each of said small and said large annuli filled with fluid under pressure.

2. The squeeze film damper recited in claim 1 wherein said groove is defined in said inner plain cylindrical surface.

3. The squeeze film damper recited in claim 1 wherein said groove is axially symmetrical with respect to a transverse plane perpendicular to said nominal axis and dividing said small annulus axial length in half.

4. The squeeze film damper recited in claim 1 wherein said groove has a rectangular configuration in axial cross section.

5. The squeeze film damper recited in claim 1 wherein said outer plain cylindrical surface is defined on an outer race of an anti-friction bearing disposed on said rotor, said bearing outer race being non-rotatable and vibrateable as a unit with said rotor.

6. A squeeze film damper for damping vibration of a rotor disposed on a support for rotation about a nominal axis of said support comprising, an anti-friction bearing on said rotor having a non-rotatable outer race vibrateable as a unit with said rotor, means on said bearing outer race defining an outer plain cylindrical surface, means on said support defining an inner plain cylindrical surface concentric with said outer surface when said rotor is aligned on said nominal axis and cooperating with said outer surface in defining a small annulus having a predetermined axial length and a radial depth corresponding to the maximum radial vibratory displacement of said rotor, means on said support defining a groove in said inner surface including a plain cylindrical base surface having an axial length of between $\frac{1}{2}$ and $\frac{2}{3}$ of said small annulus axial length and cooperating with said outer plain surface when said rotor is aligned on said nominal axis in defining a large annulus having a radial depth of at least three times said small annulus radial depth, said groove being axially symmetrical with respect to a transverse plane perpendicular to said nominal axis dividing said small annulus axial length in half and having a rectangular configuration in axial cross section, and means for maintaining each of said small and said large annuli filled with fluid under pressure.

* * * * *